(12) United States Patent
Fatato

(10) Patent No.: US 6,774,312 B2
(45) Date of Patent: Aug. 10, 2004

(54) DAMPED FLEXIBLE PROTECTIVE SLEEVING

(75) Inventor: Francis B. Fatato, Exton, PA (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 10/213,026

(22) Filed: Aug. 6, 2002

(65) Prior Publication Data
US 2003/0029627 A1 Feb. 13, 2003

Related U.S. Application Data

(60) Provisional application No. 60/311,291, filed on Aug. 9, 2002.

(51) Int. Cl.[7] ............................................. H01B 7/18
(52) U.S. Cl. ................... 174/102 D; 174/68.3; 174/74 A; 138/122; 138/124
(58) Field of Search ............... 174/102 D, 68.3, 174/74 A; 138/122, 125, 121, 129, 124, 137, 151, 113, 114

(56) References Cited

U.S. PATENT DOCUMENTS

| | | | |
|---|---|---|---|
| 2,039,781 A | 5/1936 | Debenedetti | 138/70 |
| RE24,613 E | 3/1959 | Hageltorn | 154/43 |
| 4,098,298 A | 7/1978 | Vohrer | 138/122 |

(List continued on next page.)

OTHER PUBLICATIONS

U.S. Appln. No. 10/214,507, filed Aug. 8, 2002, entitled *Damping Sleeve with Resilient Support Members* (Fryberger et al).

U.S. Appln. No. 10/214,621, filed Aug. 8, 2002, entitled *Vibration Damping Corrugated Flexible Sleeving* (Marks).

U.S. patent application Publication No. U.S. 2002/0006523, published Jan. 17, 2002, entitled *Structural Members Containing Vibration Damping Mechanisms and Methods for Making the Same* (Obeshaw).

Written Opinion for PCT/US02/24796, dated Oct. 29, 2003.

Primary Examiner—Chau N. Nguyen
(74) Attorney, Agent, or Firm—Synnestvedt & Lechner LLP

(57) ABSTRACT

A damped sleeve adapted to receive and protect elongated substrates is disclosed. The sleeve has a flexible, resilient support layer corrugated for added radial stiffness and bending flexibility. The support layer surrounds and defines an interior space for receiving the substrates. A longitudinal slit defined by facing edges in the support layer provides access to the interior space. A damping layer of non-woven felt covers the outer surface of the support layer and is attached to it along the edges defining the slit. Hook-and-loop fasteners are used to close the slit. All of the components are made from the same material so they can be attached to each other by fusing via ultrasonic welding.

22 Claims, 2 Drawing Sheets

U.S. PATENT DOCUMENTS

| | | | |
|---|---|---|---|
| 4,281,211 A | 7/1981 | Tatum et al. | 174/36 |
| 4,283,239 A | 8/1981 | Corke et al. | 156/85 |
| 4,513,787 A | 4/1985 | Hegler et al. | 138/166 |
| 4,684,762 A | 8/1987 | Gladfelter | 174/36 |
| 4,780,574 A | 10/1988 | Neuroth | 174/102 D |
| 4,797,512 A | 1/1989 | Kumagai et al. | 174/135 |
| 4,854,416 A | 8/1989 | Lalikos et al. | 181/207 |
| 4,891,256 A | 1/1990 | Kite, III et al. | 428/36.1 |
| 4,939,819 A | 7/1990 | Moyer | 24/16 R |
| 4,970,351 A | 11/1990 | Kirlin | 174/68.3 |
| 5,010,440 A | 4/1991 | Endo | 361/215 |
| 5,077,449 A | 12/1991 | Cornibert et al. | 174/107 |
| 5,129,429 A | 7/1992 | Winter et al. | 138/121 |
| 5,178,923 A | 1/1993 | Andrieu et al. | 428/36.1 |
| 5,300,337 A | 4/1994 | Andrieu et al. | 428/36.1 |
| 5,393,260 A * | 2/1995 | Barth | 454/44 |
| 5,435,871 A | 7/1995 | Streit | 156/201 |
| 5,469,892 A | 11/1995 | Noone et al. | 138/121 |
| 5,485,870 A * | 1/1996 | Kraik | 138/122 |
| 5,556,495 A | 9/1996 | Ford et al. | 156/148 |
| 5,563,510 A | 10/1996 | Gorrell et al. | 324/174 |
| 5,600,752 A * | 2/1997 | Lopatinsky | 392/488 |
| 5,626,167 A | 5/1997 | Streit | 138/118.1 |
| 5,792,532 A | 8/1998 | Pfleger | 428/36.9 |
| 5,849,379 A | 12/1998 | Gladfelter et al. | 428/35.8 |
| 5,967,194 A | 10/1999 | Martin | 138/156 |
| 6,186,182 B1 | 2/2001 | Yoon | 138/122 |
| 6,309,721 B1 | 10/2001 | Gladfelter et al. | 428/36.1 |
| 6,310,284 B1 | 10/2001 | Ikeda | 174/35 R |
| 6,321,794 B1 | 11/2001 | Ishida et al. | 138/121 |
| 6,328,080 B1 | 12/2001 | Winters | 139/388 |
| 6,332,602 B1 | 12/2001 | Oishi | 267/122 |
| 6,461,078 B1 | 10/2002 | Presby | 405/49 |
| 6,491,067 B1 | 12/2002 | Davenport et al. | 138/110 |
| 6,610,928 B2 * | 8/2003 | Synder | 174/68.3 |

* cited by examiner

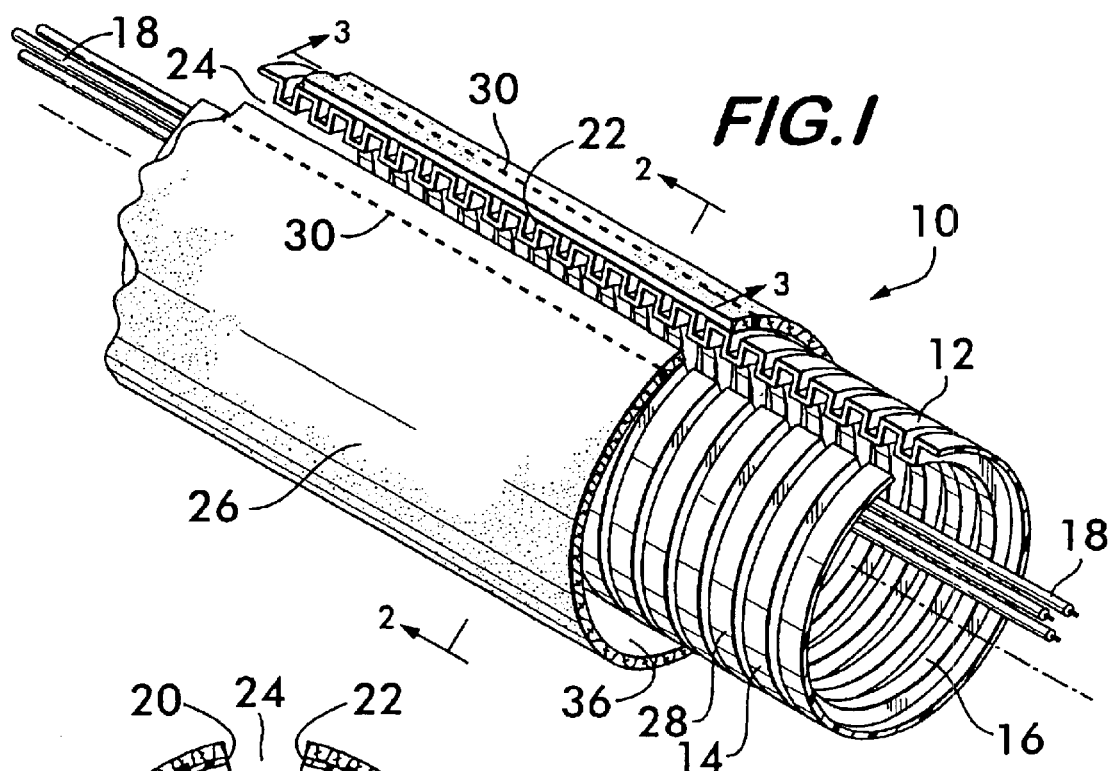
FIG. 1
FIG. 2
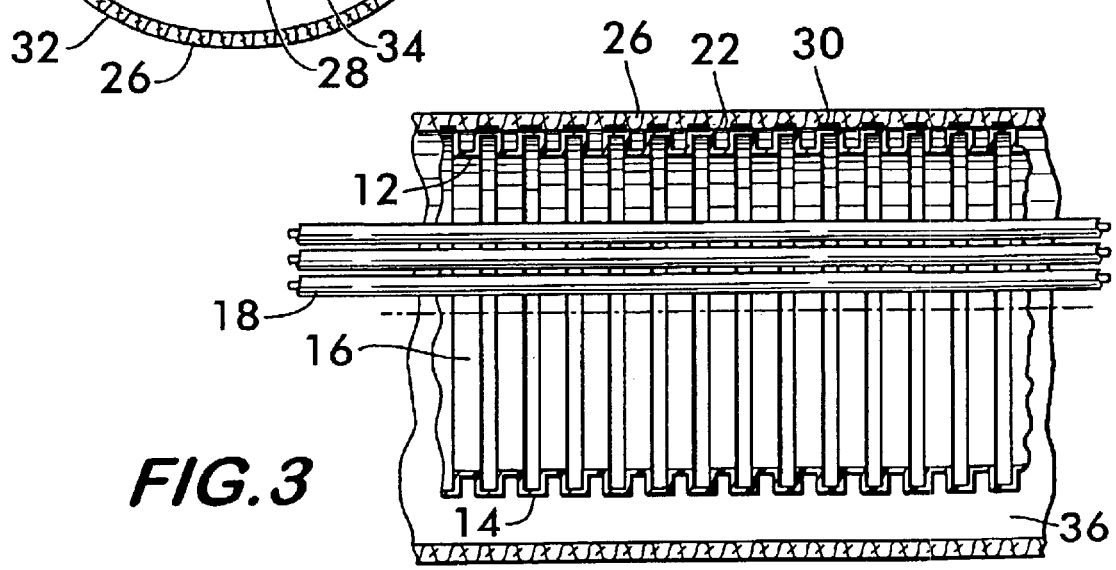
FIG. 3

DAMPED FLEXIBLE PROTECTIVE SLEEVING

RELATED APPLICATION

This application is based on and claims the benefit of U.S. Provisional Application No. 60/311,291, filed Aug. 9, 2002.

FIELD OF THE INVENTION

This invention concerns sleeving for encasing and protecting elongated substrates such as wiring harnesses and for reducing rattle noise from such substrates when they are used in a high vibration environment.

BACKGROUND OF THE INVENTION

Elongated substrates, such as wiring harnesses, fluid conduits, such as brake lines and fuel lines, and optical fiber bundles are often used in automotive, aerospace and marine environments where they are subjected to significant ambient vibration. In automotive applications, wiring harnesses in particular are pernicious sources of unwanted "rattle noise" due to their propensity to resonate in response to structure borne vibration caused by engine operation or irregularities of the road surface over which the vehicle is passing. Wiring harnesses typically extend substantially throughout the vehicle's passenger compartment where they distribute power and control signals from the engine compartment to the dashboard instruments, interior lights, radio, speakers, electric windows, electric door locks, the window defogging element and on to the trunk to power the tail lights and often an electric fuel pump which may be positioned in the fuel tank. Although the harness is intermittently attached to the vehicle structure, the lengths of the harness between attachment points will often resonate and rattle against the structure in response to relatively low-frequency vibrations within the range of human hearing and provide a source of noise, which is both annoying and a cause of concern to the vehicle occupants. Aside from the noise annoyance, vibration of wiring harnesses will cause fatigue failures of the wiring, solder joints or mechanical connectors, leading to electrical malfunctions such as short circuits which could result in a vehicle fire. The failure due to vibration and fatigue of other elongate substrates, such as fuel lines or brake lines, also has catastrophic potential. There is clearly a need for a device which will help damp vibration of elongated substrates and thereby reduce sympathetic vibration of the substrates and its resultant rattle noise and associated fatigue failures.

SUMMARY AND OBJECTS OF THE INVENTION

The invention concerns a damped sleeve adapted to receive and protect elongated substrates. The sleeve comprises a flexible, resilient, elongated tubular support layer surrounding and defining an interior space adapted to receive the substrates. The support layer has a pair of edges positioned adjacent to one another and extending lengthwise along it, the edges defining a longitudinal slit in the support layer providing access to the interior space. A damping layer is attached to the support layer along the edges and substantially covers the outer surface of the support layer. The damping layer comprises an energy absorbing material, preferably a fibrous, non-woven felt.

The felt damping layer extends radially inwardly into the slit to substantially overlap one of the edges. The other of the edges comprises a plurality of hooks extending therefrom. The hooks are removably engageable with the felt to fasten the edges together in the manner of a hook-and-loop fastener, thereby closing the slit, the slit being manually openable by disengaging the hooks from the felt.

It is an object of the invention to provide a sleeve for protecting elongated substrates.

It is another object of the invention to provide a sleeve which damps vibration.

It is again another object of the invention to provide a sleeve which is easily recycled.

These and other objects and advantages of the invention will become apparent upon consideration of the following drawings and detailed description of preferred embodiments.

BRIEF DESCRIPTION OF THE DRAWINGS

FIG. 1 is a partial cut-away perspective view of an embodiment of a sleeve according to the invention;

FIG. 2 is a cross-sectional view taken along lines 2—2 of FIG. 1;

FIG. 3 is a longitudinal sectional view of the sleeve taken along lines 3—3 of FIG. 2.

DETAILED DESCRIPTION OF THE PREFERRED EMBODIMENTS

Figure 4:
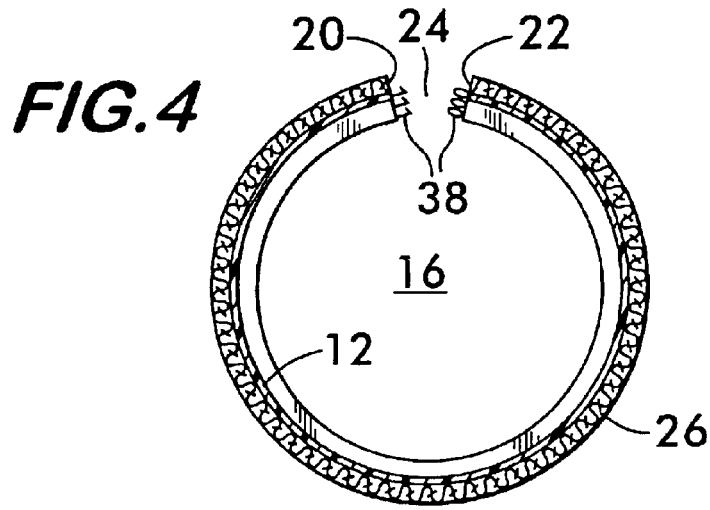
FIGS. 4–6 are cross sectional views of different embodiments of the sleeve according to the invention.

FIG. 1 shows a damped sleeve 10 according to the invention. Sleeve 10 comprises an elongated tubular support layer 12 formed from a resilient, flexible polymeric material such as polyester, polypropylene or ABS. Support layer 12 has corrugations 14 extending circumferentially around the layer. The corrugations provide radial rigidity preventing the layer from collapsing but allow for great bending flexibility allowing the support layer 12 to bend as required to follow the path of a substrate through the chassis and body of an automobile, for example.

As best shown in FIG. 2, support layer 12 surrounds and defines an interior space 16 adapted to receive elongated substrates 18 to be protected, for example, a wiring harness. The support layer 12 has a pair of edges 20 and 22 which extend lengthwise along the sleeve and face one another to define a longitudinal slit 24 in the support layer. Slit 24 provides access to the interior space 16 allowing the substrates 18 to be manually positioned therein, removed, repaired, spliced and otherwise serviced.

A damping layer 26 substantially covers an outwardly facing surface 28 of the support layer 12. Damping layer 26 is formed of an energy absorbing material, such as a non-woven polymeric felt made from polyester, polypropylene or ABS fibers. Damping layer 26 is attached to support layer 12 along edges 20 and 22, preferably by fusing the damping layer to the support layer. Ultrasonic welding is a preferred method of fusing the layers, and lines of ultrasonic welds 30 are shown extending lengthwise along the sleeve 10 adjacent to each edge 20 and 22 fixing the layers 12 and 26 to one another. To provide effective ultrasonic welds 30, it is preferred to make both the damping and support layers from the same material, thus ensuring their compatibility with one another for attachment by fusing. Using the same material for both layers also makes the sleeve easier to recycle at the end of its useful life. Fusing the layers together further facilitates ease of recycling since the use of other fastening means, such as adhesives or mechanical fasteners, is avoided. These other fastening means, if used, would introduce other materials into the sleeve which would complicate recycling of the sleeve.

Figure 5:
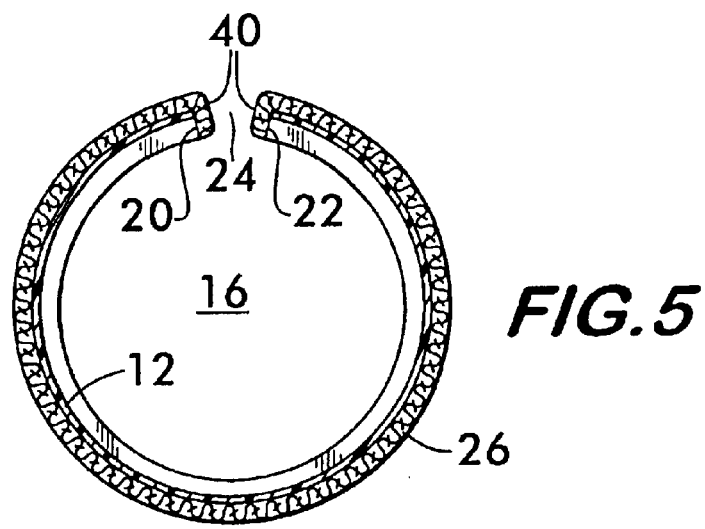
Figure 6:
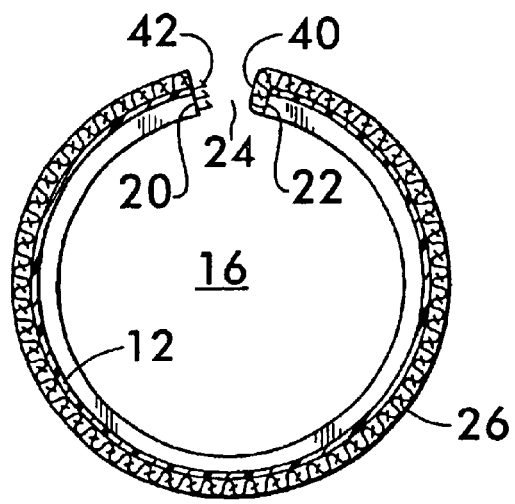

Damping layer 26 may be closely positioned circumferentially around the support layer 12, as shown in FIGS. 4 through 6, or as illustrated in FIGS. 1–3, the damping layer 26 may have a larger circumference 32 than the circumference 34 of the support layer 12. Larger circumference 32 will allow the damping layer 26 to extend radially outwardly from the support layer 12 and form an air space 36 between the layers. Air space 36 provides increased damping capability, as well as increased thermal insulation.

It is often desirable to provide a manual fastening system allowing the slit 24 to be repeatedly, reliably and easily closed and opened. The slit 24 should be closable to prevent dirt and other contaminants from fouling the interior space 16. The slit should also be openable to provide access for installing and servicing the elongated substrates 18 in the interior space. As shown in FIG. 4, hook-and-loop fasteners 38 are attached to the support layer 12 along edges 20 and 22 to effect opening and closing of slit 24. The hook-and-loop fasteners are a preferred fastening system which has all of the desired characteristics in that the hooks and loops close reliably, are easy to open and may be engaged and disengaged many times providing the desired repeatability. Hook-and-loop fasteners 38 also provide the advantage that they can be made of the same material (for example, polyester) as used to form the support layer 12 and the damping layer 26. Thus, the hooks and loops will not compromise the ability to easily recycle the sleeve 10. Furthermore, using the same material means that the hooks and loops may also be attached by fusing them to the support layer 12, thus, avoiding the need for other attachment means which might induce different materials thereby complicating recycling.

As shown in FIG. 5, it may be desirable to extend the damping layer 26 into the slit 24 and cover one or both of the edges 20 and 22 with a flap 40 of the damping layer 26. Covering the edges prevents them from rubbing against each other when the sleeve is twisted and eliminates a potential source of noise from the sleeve itself.

As shown in FIG. 6, it may also be possible to combine damping flap 40 with the hook-and-loop fasteners 38 to provide a closure which also dampens noise. Flap 40 is positioned on one edge 22 and hooks 42 from the hook-and-loop fastener system are positioned on facing edge 20. When the flap 40 is formed of non-woven felt, it can replace the loops of the hook-and-loop system and directly engage the hooks 42, allowing the slit 24 to be opened and closed. The nature of the felt inherently provides loops for engaging the hooks 42 and securing the slit closed.

The flexible protective sleeve according to the invention is effective for reducing rattle noise of elongated substrates such as wiring harnesses due to the noise and vibration damping characteristics of the non-woven felt damping layer. When such a layer contacts a neighboring structure, it tends to deaden any sound that would normally be produced by the vibration of the substrate against the structure. Energy of the vibration will also be absorbed by the felt, thus, damping the vibration and increasing the fatigue life of the items surrounded by the sleeve. Use of the sleeve will result in decreased noise from sympathetic vibrations, as well as decreased failures due to fatigue.

What is claimed is:

1. A damped sleeve adapted to receive and protect elongated substrates, said sleeve comprising:
   a flexible, resilient, elongate tubular support layer surrounding and defining an interior space adapted to receive the substrates, said support layer having a pair of edges positioned adjacent to one another and extending lengthwise along said support layer, said edges defining a longitudinal slit in said support layer providing access to said interior space; and
   a damping layer attached to said support layer along said edges and substantially covering an outer surface of said support layer, said damping layer having a larger circumference than said support layer and extending radially outwardly therefrom and thereby forming an air space between said damping and said support layers, said damping layer comprising an energy absorbing material.

2. A damped sleeve according to claim 1, wherein said damping layer extends radially inwardly from one of said edges into said slit to substantially cover said one edge.

3. A damped sleeve according to claim 2, wherein said damping layer extends radially inwardly into said slit from the other of said edges to substantially cover the other of said edges.

4. A damped sleeve according to claim 1, wherein said support layer is formed from a polymeric material.

5. A damped sleeve according to claim 4, wherein said polymeric material is selected from the group consisting of polyester, polypropylene and ABS.

6. A damped sleeve according to claim 1, wherein said damping layer comprises a fibrous, non-woven felt.

7. A damped sleeve according to claim 6, wherein said damping layer is formed from a polymeric material.

8. A damped sleeve according to claim 7, wherein said polymeric material is selected from the group consisting of polyester, polypropylene and ABS.

9. A damped sleeve according to claim 8, wherein said support layer comprises the same material as said damping layer.

10. A damped sleeve according to claim 9, wherein said damping layer is fused to said support layer lengthwise along said edges.

11. A damped sleeve according to claim 10, wherein said damping layer is fused to said support layer by ultrasonic welding of said damping layer to said support layer.

12. A damped sleeve according to claim 1, wherein said support layer comprises a plurality of corrugations.

13. A damped sleeve according to claim 1, wherein said damping layer comprises a fibrous, non-woven felt and extends radially inwardly into said slit to substantially cover one of said edges.

14. A damped sleeve according to claim 13, wherein the other of said edges comprises a plurality of hooks extending therefrom, said hooks being removably engageable with said felt to fasten said edges together in the manner of a hook-and-loop fastener, thereby closing said slit, said slit being manually openable by disengaging said hooks from said felt.

15. A damped sleeve according to claim 1, wherein an elongated substrate is received within said interior space.

16. A damped sleeve according to claim 15, wherein said elongated substrate comprises a wiring harness.

17. A damped sleeve adapted to receive and protect elongated substrates, said sleeve comprising:

- a flexible, resilient, elongate tubular support layer surrounding and defining an interior space adapted to receive the substrates, said support layer having a plurality of circumferential corrugations providing radial stiffness and bending flexibility and a pair of edges positioned adjacent to one another and extending lengthwise along said support layer, said edges defining a longitudinal slit in said support layer providing access to said interior space; and
- a damping layer attached to said support layer along said edges and substantially covering an outer surface of said support layer, said damping layer having a larger circumference than said support layer and extending radially outwardly therefrom and thereby forming an air space between said damping and said support layers, said damping layer comprising a fibrous, non-woven felt.

18. A damped sleeve according to claim 17, wherein said damping layer is formed from a thermoplastic polymeric material selected from the group consisting of polyester, polypropylene and ABS.

19. A damped sleeve according to claim 18, wherein said support layer comprises the same material as said damping layer.

20. A damped sleeve according to claim 19, wherein said damping layer is fused to said support layer lengthwise along said edges.

21. A damped sleeve according to claim 20, wherein said damping layer is fused to said support layer by ultrasonically welding said layers together.

22. A damped sleeve according to claim 17, wherein said damping layer extends radially inwardly into said slit to substantially cover one of said edges.

\* \* \* \* \*